United States Patent [19]
Smalley et al.

[11] Patent Number: 5,471,400
[45] Date of Patent: Nov. 28, 1995

[54] METHOD FOR DETECTING AND SPECIFYING COMPRESSOR CYLINDER LEAKS

[75] Inventors: Anthony J. Smalley; C. Richard Gerlach, both of San Antonio, Tex.; Ralph E. Harris, Cary, N.C.

[73] Assignee: Gas Research Institute, Chicago, Ill.

[21] Appl. No.: 248,458

[22] Filed: May 24, 1994

[51] Int. Cl.$^6$ .......................... G01F 22/02; G01F 25/00; G06G 7/57
[52] U.S. Cl. .......................... 364/509; 364/578; 364/803
[58] Field of Search .......................... 364/509, 510, 364/578, 150, 151, 803, 805; 395/919, 920; 73/117.1, 115

[56] References Cited

U.S. PATENT DOCUMENTS

| | | | |
|---|---|---|---|
| 3,506,819 | 4/1970 | Carli et al. | 235/184 |
| 3,529,144 | 9/1970 | Patterson et al. | 235/197 |
| 4,424,571 | 1/1984 | Edlund | 364/806 |
| 4,429,371 | 1/1984 | Brown | 364/803 |
| 4,559,610 | 12/1985 | Sparks et al. | 364/803 |
| 4,633,707 | 1/1987 | Haddox | 73/47 |
| 4,852,054 | 7/1989 | Mastandrea | 364/509 |
| 4,995,258 | 2/1991 | Frank | 73/118.2 |
| 5,018,069 | 5/1991 | Pettigrew | 364/424 |
| 5,272,646 | 12/1993 | Farmer | 364/509 |

OTHER PUBLICATIONS

Harris, R. E., et al., "Computer Based Diagnostic Tools for Compressor Performance Evaluation," Energy–sources Technology Conference and Exhibition, New Orleans, La., Jan. 14–18, 1990.
Gerlach, C. R., et al., "Fault Implantation: A Powerful Knowledge–Based Technique for Reciprocating Compressor Diagnostics," American Gas Association Operating Section Distribution/Transmission Conference, New Orleans, La., May 21–24, 1989.
Harris, R. E., et al., "Compressor Cylinder Performance Analysis: The Next Generation of Software Capabilities," Sixth Annual Reciprocating Machinery Conference, Salt Lake City, Utah, Sep. 23–26, 1991.
Smalley, A. J., et al., "Gas Compressor Diagnostics Advance," The American Oil & Gas Reporter, May 1992 pp. 42–45.
Smalley, A. J., et al., "Recent Software Advances for Diagnosing and Analyzing Reciprocating Compressor Performance," 1992 International Gas Research Conference.
Smalley, A. J., et al., "Optimizing compressor operation saves money," Pipe Line Industry, Dec. 1992, pp. 40–45.

*Primary Examiner*—Emanuel T. Voeltz
*Assistant Examiner*—M. Kemper
*Attorney, Agent, or Firm*—Hopkins & Thomas; Scott A. Horstemeyer

[57] ABSTRACT

A computer-based system and method detects and specifies valve and ring leaks in reciprocating compressors of the type used in natural gas transmission networks. The system employs a method comprising the following steps. The cylinder pressure is measured as a function of cylinder volume to obtain a measured PV card. A predictive model then calculates a predicted PV card for the subject compressor cylinder without including effects of simulated leaks. The predicted PV card is them compared to the measured PV card. The nature and character of the differences between the measured and predicted PV cards indicates whether a leak in the subject compressor cylinder is a suction valve leak, a discharge valve leak, or a piston ring leak. The predictive model is then iterated with simulations of the indicated leak included until the resulting predicted PV card matches the actual measured PV card for the compressor cylinder. The final value of the leak parameters in the model required for the match indicate the nature and magnitude of a corresponding actual leak in the compressor cylinder. Other useful information such as the efficiency of the compressor system with and without the leak and the economic impact of the leak are also derived from the iterative match process.

16 Claims, 14 Drawing Sheets

METHOD FOR DETECTING AND SPECIFYING COMPRESSOR CYLINDER LEAKS

TECHNICAL FIELD

The present invention relates generally to reciprocating compressors of the type used in natural gas processing, storage, and delivery networks. More particularly, the present invention relates to a computer-based system and method for monitoring the performance of such compressors to detect compressor cylinder leaks, to specify the nature and magnitude of such leaks, and to estimate the performance of an affected compressor when leaks are accounted for.

BACKGROUND OF THE INVENTION

The United States gas transmission pipeline industry depends significantly on reciprocating compressors to achieve its gas pumping capacity. The industry currently operates over 4000 of these compressors. In general, such compressors include one or more cylinders within which reciprocating pistons are disposed. The pistons are driven by a traditional crankshaft that, in turn, is driven by an electric motor, diesel or natural gas burning engine, or other appropriate motor. A suction valve through which gas is drawn on the down or suction stroke of the piston and a discharge valve through which gas is expelled on the up or discharge stroke of the piston are disposed at the head of each cylinder. With both valves closed, the piston, cylinder walls, and cylinder head trap a volume of gas subsequently referred to as the compression volume. During the compression stroke, motion of the piston towards the head increases pressure of the trapped gas. During the re-expansion stroke, motion of the piston away from the head decreases pressure of the trapped gas. Piston rings encircle the pistons and bear against the cylinder walls to form a seal between the pistons and the cylinder walls during compressor operation. Most compressors are designed to employ double-acting pistons with a trapped compression volume of gas on either side of the piston. Each trapped volume, sometimes termed a "end", has its own suction and discharge valves. Such compressors function to pump and convey natural and other gases along a pipeline.

There are compelling reasons to operate reciprocating compressors at maximum efficiently. Efficient operation reduces the energy required to operate the compressors, which usually is derived directly or indirectly from fossil fuels. Efficient operation also minimizes emissions from leaky compressor components and directly benefits compressor operators by reducing operating costs. Compressor operators thus strive to minimize conditions that lead to reduced compressor efficiency.

Primary causes of reduced compressor operating efficiency are leaks that can develop as a result of day-to-day operation. Such leaks can occur between the piston rings and the cylinder walls, permitting gas to leak past the piston as it reciprocates within the cylinder. Leaks can also occur in the suction and discharge valves of compressors. A leaky suction valve allows some gas to migrate back through the suction valve during the compression stroke, discharge, and re-expansion strokes of the piston. Similarly, a leaky discharge valve can allow the migration of some gas back into the cylinder through the discharge valve during the re-expansion, compression or suction stroke of the piston. Either of these conditions results in reduced flow rate and thus reduced efficiency of the compressor. Such leaks also tend to worsen with time resulting in steadily deteriorating mechanical health of the compressor.

Obviously, early detection, diagnosis, and repair of leaky compressor components is crucial to maintain such compressors at peak operating efficiency. To accomplish this, many gas transmission companies have instituted maintenance programs guided by regular periodic testing and inspection of their reciprocating compressors. These inspections usually include periodic measurement of cylinder pressure as a function of changing cylinder volume as the piston reciprocates to produce a pressure versus volume diagram known as a PV card. From visual inspection of the measured PV card, a skilled and experienced operator can often diagnose the existence of cylinder problems such as leaky valves or leaky piston rings. Ultrasonic measurements can also be an effective supplement for detecting valve leaks in compressors.

While manual analysis of measured PV cards provide some ability to diagnose and pinpoint leaks in reciprocating compressors, it nevertheless exhibits numerous inherent problems and shortcomings. For instance, the accuracy and dependability of such analysis depends strongly on the experience and intuition of the individual analyzing the PV card. Accordingly, the diagnosis is subject to human mistakes and errors in judgment that render the results somewhat unreliable. This is important because misdiagnosed leaks can lead to expensive down time for repairs that may be unnecessary. In addition, manual analysis of the PV card provides only an indication of the general nature of a leak in the compressor. It usually does not provide a detailed analysis of the severity of the leak, does not express the problem in usable terms such as cost of wasted fuel, and cannot predict with any accuracy the overall performance of the compressor system with the leak and with the leak repaired.

Accordingly there exists a continuing and heretofore unaddressed need for a method of detecting and specifying compressor cylinder leaks that is reliable, not dependent upon human experience and intuition, that specifies detected leaks in detail including the location and severity of the leak, than provides usable information regarding the impact of the leak on compressor efficiency, and that infers the overall performance of the compressor system with and without the leak. It is to the provision of such a method that the present invention is primarily directed.

SUMMARY OF THE INVENTION

It is an object of the present invention to overcome the deficiencies and inadequacies as noted above and as generally known in the industry.

Another object of the present invention to provide a system and method for detecting and specifying compressor cylinder leaks that reliably predict both the nature of leaks and their likely magnitudes.

Another object of the present invention is to provide a system and method for reliably and accurately detecting and specifying significant compressor cylinder leaks.

Another object of the present invention is to provide an automated system and method for detecting and specifying compressor cylinder leaks that do not rely on the experience and intuition of trained personnel.

Another object of the present invention is to provide a system and method for detecting and specifying compressor cylinder leaks that provide useful information regarding the economic impact of detected leaks so that financially effective maintenance and repair can be scheduled.

Briefly described, the present invention is an improved computer-based system and method for detecting and specifying leaks in a reciprocating compressor system. The system and method are partially implemented via a computer which is programmed to carry out analytical steps. The computer is coupled to a subject compressor cylinder through a performance analyzer that provides the computer with actual measured cylinder pressure as a function of compressor crankshaft angle. From this measured data and kinematic information about the compressor such as bore, stroke, and rod diameter, the computer program constructs the characteristic measured PV card comprising the cylinder pressure versus cylinder volume functions for the operating compressor cylinder. This measured data forms the basis upon which the method of the invention operates to detect and specify leaks that might be present in the compressor system.

The system and method of the present invention makes use of a thermodynamic predictive model of the reciprocating compressor cylinder operation. The model accounts for suction of gas into the cylinder on the suction stroke of the piston, expulsion of gas from the cylinder on the discharge stroke of the piston, heat transfer to and from the walls of the cylinder, and temperature changes in the gas that occur during the compression cycle. The model also incorporates simulations of the effects of leakage flows in the suction and discharge valves and leakage flows past the piston rings of the compressor. Changeable parameters in the model control the nature and magnitude of the simulated leakage flows.

The output of the thermodynamic predictive model is a calculated or predicted PV card for the compressor cylinder represented in the model. In use, the kinematic attributes of a particular cylinder being tested are input to the model so that the output of the model is a predicted PV card for the particular compressor cylinder in question. Initially, the predicted PV card is calculated without including any simulated leaks. This results in an ideal predicted PV card for the modeled compressor cylinder. This predicted PV card is then compared to the actual PV card for the cylinder in question. If there are differences between the predicted ideal PV card and the actual measured card, the method employs built in knowledge to infer the likely cause of the difference. For example, certain types of pressure versus volume curve variations are known to result generally from discharge valve leaks while other types of variations indicate a suction valve or piston ring leak.

Once a type of leak is hypothesized, it is implanted into the thermodynamic predictive model as a simulated leak and the model makes another prediction with the leak. The resulting predicted PV card is again compared to the measured PV card and further leak parameter changes in the model are made based on the differences. The model is then rerun again to produce yet another predicted card for comparison. This iterative process continues with the magnitudes of the simulated leak being adjusted on each iteration until the difference between the predicted and measured PV cards is within a predetermined acceptable maximum; i.e., until the measured and predicted cards match. The final settings of the leak parameters in the model that resulted in the match are then be analyzed to determine the type, location, and magnitude of the leak represented in the measured data.

More directly pertinent information such as the overall efficiency of the compressor with its leak and its expected efficiency with the leak repaired are also calculated from the results of the iterative matching procedure. The model can also predict the economic impact of the leak in terms of wasted operating costs incurred as a result of the leak. All of this information can then be used by the compressor operator to plan the most efficient compressor maintenance and repair and to insure that unnecessary repairs are not performed.

The novel system and method of the present invention has proven its ability to predict the types and magnitudes of significant compressor cylinder leaks reliably, and accurately. In addition, application of the system and method is convenient, relatively inexpensive, and can be implemented using a standard personal computer. The computer itself can be located at the compressor or at a distant location for remote monitoring. Measured data can be fed directly to the computer for real-time analysis or can be stored on disk for off-line analysis. In addition to the diagnosis of leaks, the method also provides pertinent information regarding the economic impact of the leaks so that financially responsible maintenance and repair can be scheduled and unnecessary repair avoided.

These and other objects, features, and advantages of the present invention will become more apparent upon review of the detailed description set forth below taken in conjunction with the accompanying drawing figures, which are briefly described as follows.

BRIEF DESCRIPTION OF THE DRAWINGS

The invention can be better understood with reference to the following drawings.

DETAILED DESCRIPTION OF THE PREFERRED EMBODIMENT

Figure 1:
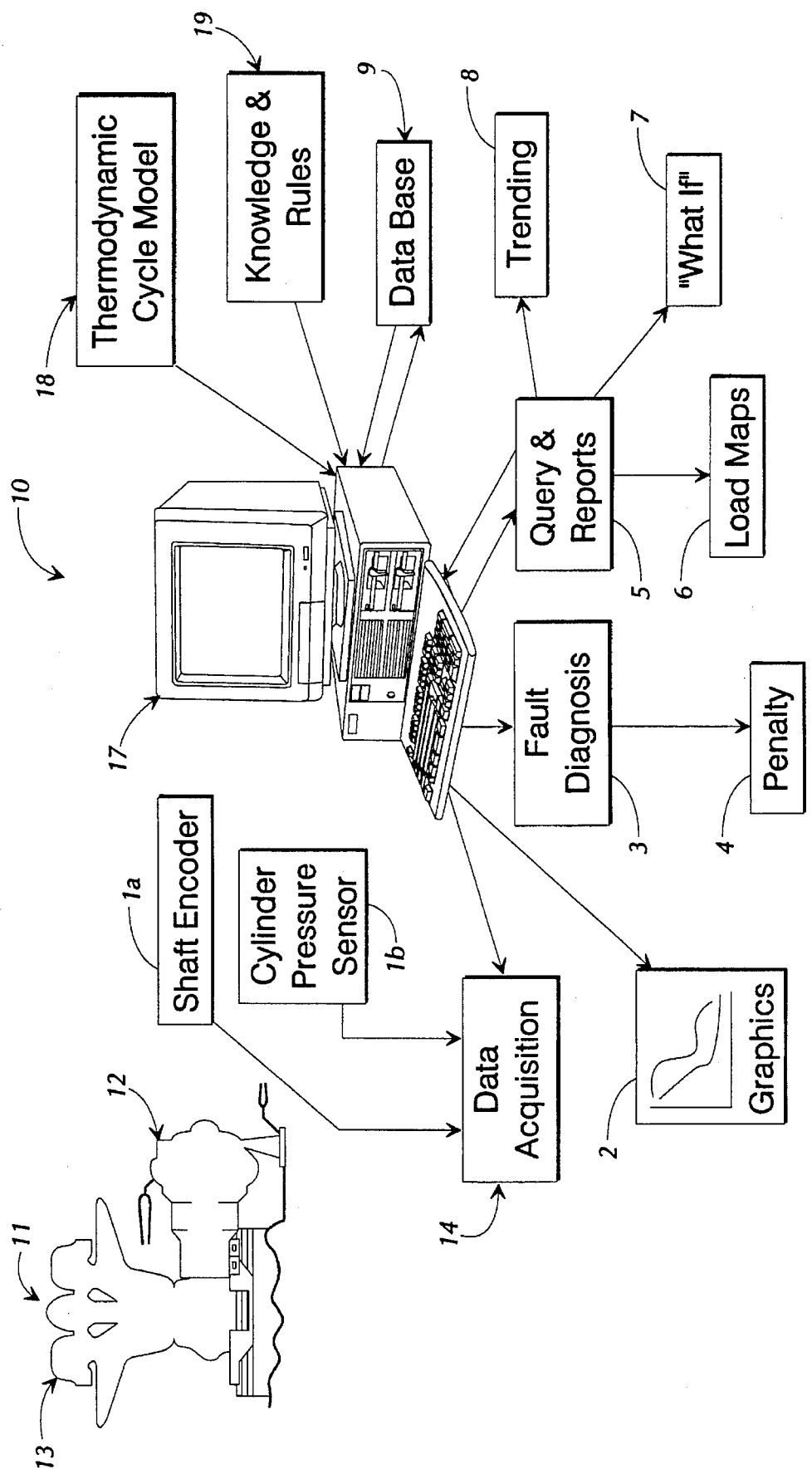
FIG. 1 is a illustrative diagram showing the major component interconnections in a system for implementing the method of the present invention.

The invention is described in detail with reference to the accompanying drawings and charts, in which reference numerals are used to refer to the various components and elements of the invention.

Figure 2:
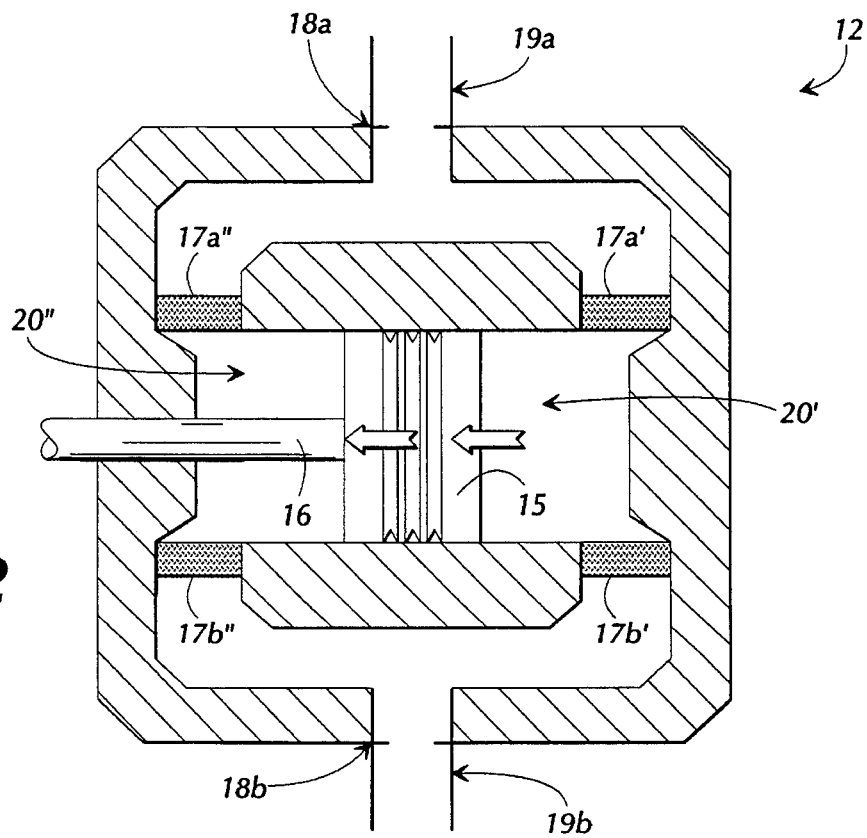
FIG. 2 is an illustrative diagram showing the major elements of a double-acting compressor cylinder.

FIG. 1 illustrates typical interconnections in a system 10 for implementing the novel method of the present invention to detect and specify compressor cylinder leaks. A compressor 11 comprises one or more double-acting compressor cylinders 12 driven by an electric or fuel gas powered motor 13. In general, the construction and operation of double-acting compressor cylinders 12 are well known in the art. However, for purposes of discussion and for better clarity in understanding the present invention, a brief discussion of a conventional double-acting compressor cylinder 12 is set forth hereafter, As shown in FIG. 2, each cylinder 12 has an internal reciprocating piston 15 driven by a crankshaft 16 that, in turn, is driven by the motor 13. Each compression volume 20', 20" of the double-acting cylinder 12 is provided with one or more one-way suction valves 17a', 17a", respectively, through which gas enters the corresponding compression volume 20', 20", and one or more oppositely directed discharge valves 17b', 17b", respectively, through which gas is expelled from the corresponding compression volume 20', 20". Gas enters each of the suction valves 17a', 17a" by way of a suction orifice 18a and a suction nozzle 19a. Gas is discharged from each of the discharge valves 17b', 17b" outwardly to a discharge orifice 18b and through a discharge nozzle 19b. Differences in the pressures on either side of the piston 15 determines the tendency of the valves 17a', 17a", 17b', 17b" to open or close, as is well known in the art. The reciprocating piston 15 within the cylinder 12 is also provided with piston rings that surround the piston and bear against the walls of the cylinder 12 to prevent leakage of gas past the piston 15 as it reciprocates.

The operation of the double-acting compressor cylinder 12 of FIG. 2 is as follows. During the stroke of the piston 15 as indicated by reference arrows in FIG. 2, the compression volume 20' is increased from its minimum to maximum volume, while the compression volume 20" is decreased from its maximum to minimum volume. During the foregoing stroke, the pressure in the compression volume 20' is initially reduced below that pressure outside the suction valve 17a'. When the pressure outside the suction valve 17a' is greater than that in the compression volume 20', the suction valve 17a' opens and gas flows into the compression volume 20'. Continued piston motion increase the compression volume 20' and decrease the compression volume 20" draws gas into the cylinder 12 through suction nozzle 19a until the piston 15 reaches the extreme point of its travel, where compression volume 20' is at its maximum and compression volume 20" is at its minimum. At this point, or thereabouts, the pressure in the compression volume 20' increases above the pressure outside the suction valve 17a' and the suction valve closes.

Furthermore, during the aforementioned stroke, the pressure in the volume 20" is increased until the pressure in the compression volume 20" exceeds the pressure outside the discharge valve 17b", thereby causing the discharge valve 17b" to open. Continued motion of the piston 15 to reduce the compression volume 20" and increase compression volume 20' expels gas from the Compression volume 20" out the discharge valve 17b" until the piston 15 reaches the extreme point of its travel where compression volume 20" is at its minimum and volume 20' is at its maximum. At this point or thereabouts, pressure in the compression volume 20" drops below the pressure outside the discharge valve 17b" and the discharge valve 17b" closes.

The stroke then reverses direction. While the piston 15 moves in the reverse direction, the suction valve 17a" and the discharge valve 17b' operate similar to suction valve 17a' and discharge valve 17b", respectively, as described above. The result of the foregoing operation is a pumping action that conveys gas through a delivery pipeline network coupled to the compressor 11.

The compressor 11 operates most efficiently when the suction and discharge valves 17a', 17a", 17b', 17b" close completely at the appropriate time and when the piston rings seal completely against the sides of the cylinder wall. Over time, however, leaks can develop in the suction and discharge valves 17a', 17a", 17b', 17b" and past the piston rings. Such leaks reduce the efficiency of the compressor 11 by allowing some gas to migrate back through a closed valve or past the piston rings during compressor operation. It is a primary object of the present invention to detect such leaks, to specify their nature and severity, and to predict compressor efficiency degradation as a result of and the economic impact of the detected leaks.

A data acquisition system. 14, shown in FIG. 1, which can be a performance analyzer triggered by a shaft encoder, is coupled to the compressor system 11. A cylinder pressure sensor is mounted in each compression volume 20', 20' of the compressor cylinder 12 and provides the data acquisition system 14 with the pressure level within the cylinder 12 as well as the dynamic change in pressure. The cylinder pressure sensor can be a transducer of the strain gauge diaphragm or strain gauge semiconductor type or any other transducer that measures pressure level and responds accurately to dynamic pressure changes in the cylinder. Furthermore, while pressure will be used herein as the particular measurable characteristic selected for use in the method of this invention, it will be understood by those of skill in the art that other measurable characteristics might also be selected. Thus, the term "selecting measurable characteristics" as used herein should be understood to mean selecting pressure, temperature, or any other useful measurable characteristic that might function with the method of the invention. A shaft encoder is coupled to the crankshaft 16 of the compressor 11 and provides the cylinder indicator 14 with the crankshaft rotation angle as a function of time.

With the pressure and crankshaft angle continuously available, the cylinder indicator 14 measures and records the pressure within the cylinder at small even increments of crankshaft rotation from a known reference. Knowledge of the piston size, configuration, and stroke characteristics provides a known relationship between crankshaft rotation angle and cylinder volume. Thus, the cylinder pressure as a function of cylinder volume 20', 20" can be calculated by the cylinder indicator resulting in a measured PV card for the cylinder under analysis. This PV card can then be stored on data disks for later analysis or can be transmitted directly to a computer 17 for real-time analysis.

Figure 4:
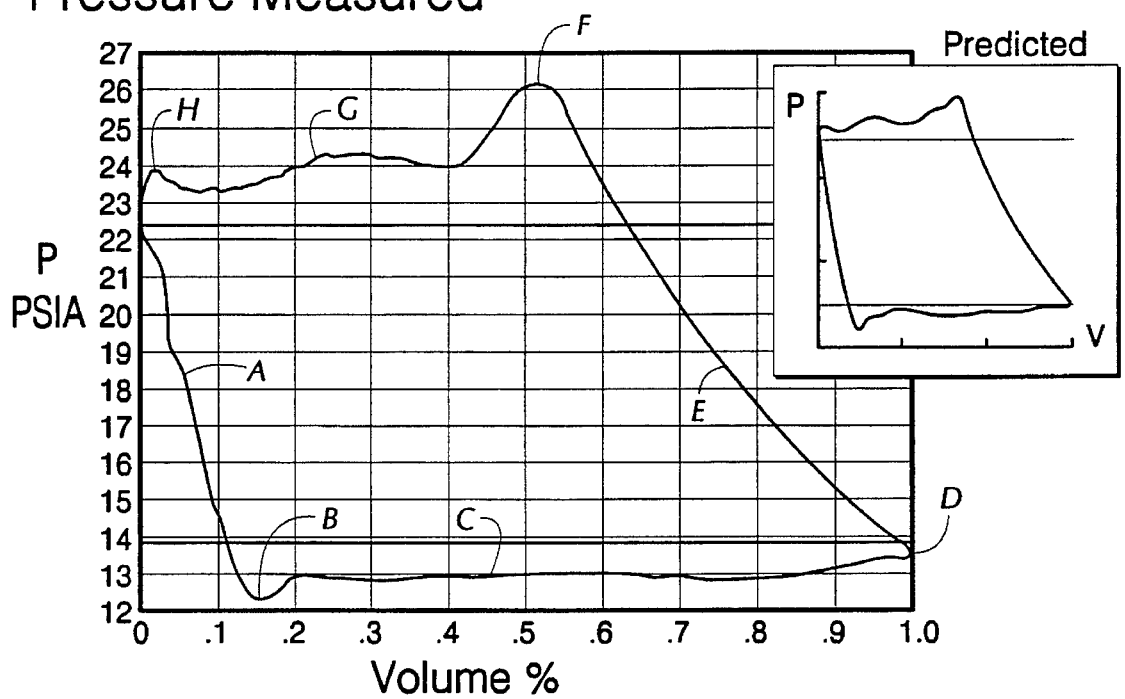
FIG. 4 illustrates a typical pressure versus volume function or PV card for a reciprocating compressor and also illustrates a PV card as simulated in the method of the present invention.

FIG. 4 illustrates a typical measured PV (pressure versus volume diagram) card for an operating compressor cylinder 12. In the graph of FIG. 4, pressure within the cylinder 12 is plotted as a function of the volume (either 20' or 20") within the cylinder 12 as the piston reciprocates. In this graph, zero percent volume represents the volume (either 20' or 20") within the cylinder 12 when the piston 15 is at the top of its stroke, while 100% volume (1.0 on the graph) represents the volume within the cylinder 12 when the piston 15 is at the bottom of its stroke. As the piston 15 starts at the top of its stroke and begins to move downward thus increasing the volume within the cylinder 12, the pressure within the cylinder 12 initially begins to drop as a result of the suction caused by the downward moving piston 15 during its re-expansion stroke. This initial drop in pressure is indicated an A on the graph of FIG. 4. As the volume in the cylinder 12 continues to increase, the suction within the cylinder 12 becomes sufficient to open the suction valve to allow gas to be drawn into the cylinder 12. The opening of the suction valve is indicated at B on the chart of FIG. 4. As the piston 15 continues to move down, gas drawn through the suction valve into the cylinder 12 so that the pressure within the cylinder 12 remains substantially constant, indicated at C, until the piston 15 reaches the bottom of its stroke at D.

The piston 15 then begins to move upwardly on its compression stroke thus reducing the volume (either 20' or 20") within the cylinder 12. This causes the suction valve (either 17a" or 17a') to close so that the pressure within the cylinder 12 begins to rise, as indicated at E in FIG. 4. Ultimately, the pressure within the cylinder 12 becomes sufficient to open the discharge valve in the cylinder 12, as indicated at F in FIG. 4, whereupon further upward movement of the piston 15 pushes gas through the open discharge valve and out of the cylinder 12. The pressure within the cylinder 12 during this discharge phase remains relatively constant as indicated at G in FIG. 4. The piston 15 reaches the top of its stroke again at H and the entire cycle repeats. The result is a pumping of the gas from an intake manifold to a discharge manifold to convey the gas along a pipeline.

Referring back to FIG. 1, the measured PV card for a compressor cylinder 12 as just described is provided to a computer 17 which is programmed to carry out the analytical portion of the method of the present invention. The computer program includes an analytical predictive thermodynamic cycle model 18 of the compressor 11. The thermodynamic cycle model 18 simulates the processes that occur within a reciprocating compressor cylinder 12 and produces a predicted PV card based on knowledge 19 of the compressor thermodynamic process and stored data 9 specifying kinematic characteristics of the compressors 11 being modeled.

The predictive thermodynamic cycle model 18 will be described in greater detail below. In general, however, the cycle model 18 includes the ability to simulate the effects of the suction valves 17a', 17a", discharge valves 17b', 17b", and piston ring leaks within the compressor cylinder 12. The inclusion of these simulated leaks in the thermodynamic cycle model 18 effects the configuration of the predicted PV card in the same way that actual leaks affect a measured PV card. Initially, the thermodynamic cycle model 18 is executed without including leaks to produce an ideal predicted PV card. The predicted PV card is then compared to the actual measured PV card from the operating compressor cylinder 12. Based on the characteristics of the differences between the two cards, simulated leaks within the thermodynamic cycle model 18 are increased or decreased to reduce the differences between the cards. The thermodynamic cycle model 18 is then rerun with the changed leak parameters and the new resulting PV card is compared again to the measured PV card, This process is repeated iteratively until the predicted PV card matches the actual measured PV card to within acceptable tolerances.

Once a match has been achieved, the simulated leak parameters required to produce the match are analyzed to predict a variety of useful information including the nature and severity of an actual leak represented in the measured PV card, the efficiency of the compressor 11 in question both with and without the leaks detected therein, and the overall financial impact on the operating costs of the compressor 11 with detected leaks. This information can then be used to determine the most financially opportune time to take the compressor 11 off-line and repair its leaks. Accordingly, unnecessary or economically unwise repairs are avoided allowing the overall system to operate at the greatest possible efficiency.

Figure 3:
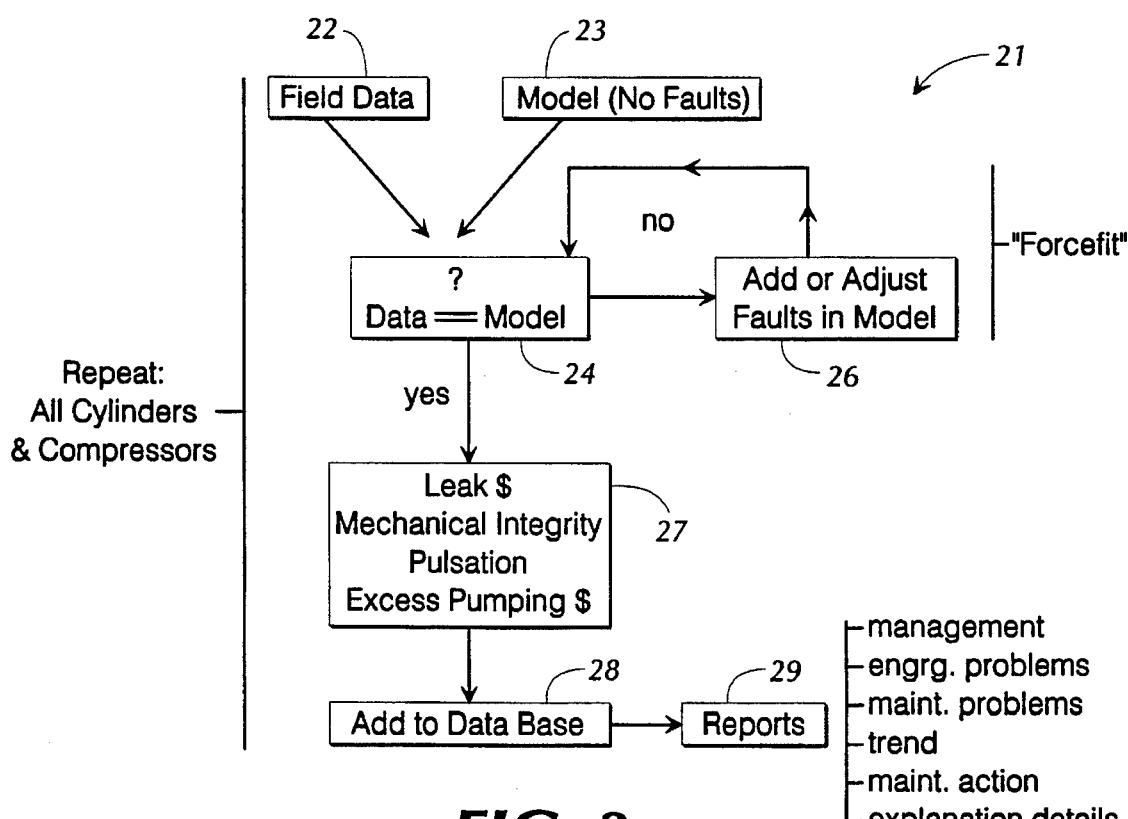
FIG. 3 is a top level block diagram illustrating a preferred method of implementing the present invention.

FIG. 3 depicts the method 21 of the present invention in very general top level flowchart format. Field data 22 in the form of a measured PV card is provided along with a predicted PV card 23 resulting from the analytical predictive thermodynamic cycle model 18. Initially, the predicted PV card includes no effects from simulated leaks within the thermodynamic cycle model 18. The two PV cards are then compared as indicated by reference numeral 24. If the two PV cards do not match, which usually is the case initially, the predictive thermodynamic cycle model 18 is rerun at 26 with simulated leaks to produce a new predicted PV card. This new PV card is again compared to the measured PV card at 24 and the loop is repeated iteratively until the simulated leaks produce a predicted PV card that matches the actual measured PV card. This iterative adjustment and comparison process is referred to as a "force fit" in FIG. 3.

When the simulated leaks produce matching PV cards, the values of the leak parameters required to produce the match are analyzed at reference numeral 27 to produce a diagnosis of the nature, location, and severity of the actual leak represented in the measured PV card and this diagnosis is added to the database at reference numeral 28. The system then produces usable reports at reference numeral 29 that are helpful in determining the economic impact of leaks within the subject compressor cylinder 12 and the most financially responsible time to take the compressor 11 off-line for repairs.

Figure 5:
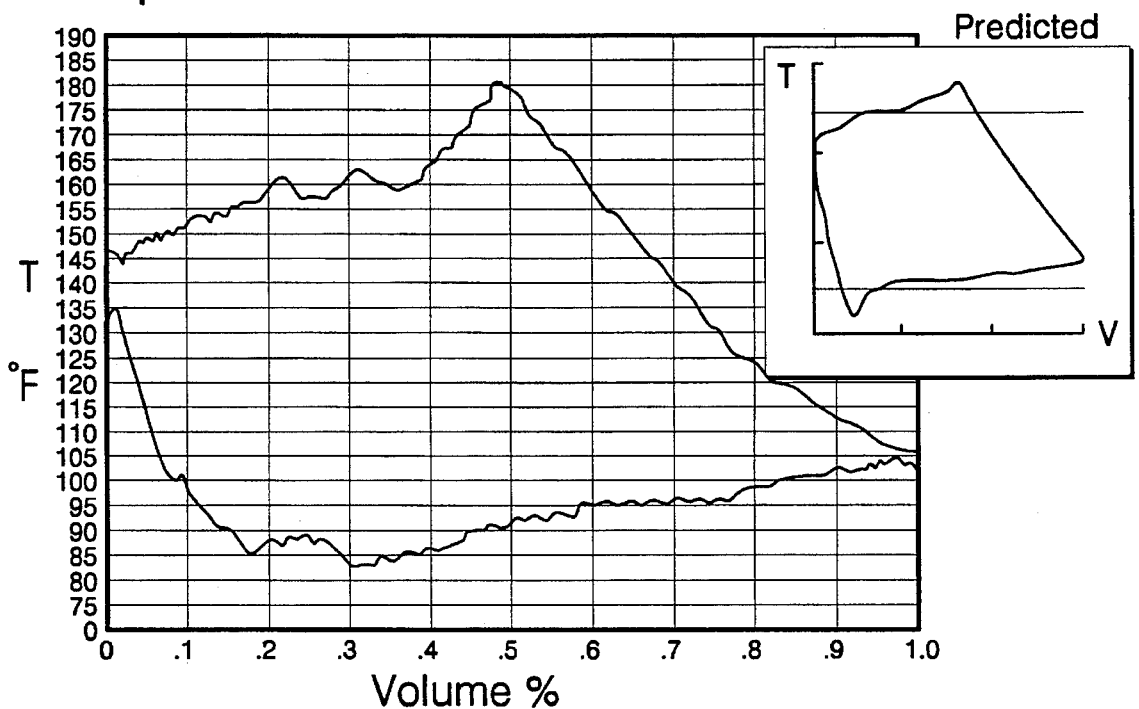
FIG. 5 illustrates a typical temperature versus volume function for a reciprocating compressor and also illustrates a temperature versus volume function as simulated in the method of the present invention.

In calculating the predicted PV cards and temperature volume profiles, as shown in FIG. 5, for a given compressor cylinder 12, the method of the present invention draws upon known characteristics of the compressor 11 such as piston size, cylinder clearance, piston stroke characteristics, and the like. The predictive thermodynamic cycle model 18 then solves the first law of thermodynamics, step by step, for small intervals of crankshaft rotation. In each interval, the thermodynamic cycle model 18 adds up piston work, enthalpy flow through the valves and rings, and heat transferred to or from cylinder walls to give the change in internal energy within the cylinder 12. This, in turn, yields a new gas temperature. This process for each interval of crankshaft rotation is summarized in equations 1 and 2 for an ideal gas.

$$\Delta U = \Delta Q - \Delta W + \Delta t \sum_i \dot{m}_i h_i \qquad (1)$$

$$T = U/C_v \qquad (2)$$

Mass flow through valves and rings during the interval gives a new mass in the cylinder 12. Knowledge of the temperature, mass, cylinder volume 20', 20", and gas properties yields a predicted gas pressure for the interval, as summarized in equations 3 and 4.

$$\Delta m = \Delta t \sum_i \dot{m}_i \qquad (3)$$

$$P = mZRT/V_{cyl} \qquad (4)$$

Recording the calculated pressures and temperatures as a function of crankshaft rotation angle and thus cylinder volume 20', 20" results in the predicted PV cards and temperature versus volume profiles shown in the upper right-hand portions of FIGS. 3 and 4.

The valves 17a', 17a", 17b', 17b" of the compressor cylinder 12 are simulated in the predictive thermodynamic cycle model 18 as having a single moving element (plate, poppet, channel element, or ring) acted on by gas and spring forces. When the opening gas force exceeds the closing spring force, the valve element accelerates at a rate of net force divided by mass according to the equation $F=ma$. The thermodynamic cycle model 18 updates valve velocity and displacement each iterative interval to yield a valve flow area for the interval. The differential between cylinder pressure and pressure outside the valve determines direction and magnitude of flow through the instantaneous flow area, based on the orifice flow equation. For nominally closed valves, the flow area is modeled as the leak area, if any.

For real gases, properties used in the equations are updated each interval using the Benedict-Webb-Rubin equation-of-state. In this regard, see Anderson, J. B., *Documentation of the Benedict-Webb-Rubin Mark-2 Program*, American Gas Association Transmission Conference, May 22–24 1992, San Francisco, Calif. which is incorporated herein by reference as if set forth in full hereinbelow. The integration process yields histories of pressure, temperature, volume, valve flows, and valve displacements for each interval of crankshaft rotation. These characteristics are graphed, integrated, and interpreted in various ways. In particular, the thermodynamic cycle model 18 obtains total flow from the cylinder 12 by summing discharge valve flow for each interval. Back flow through leaking valves is separately totaled. The thermodynamic cycle model 18 accumulates a valve lift index, which is the average percentage non-zero displacement of the valve from a closed position. Ideally, this index would be 100%. A value of 60% or less indicates possible valve flutter. Other valve parameters are calculated such as opening and closing velocities and degrees of early or late closing.

Figure 6:
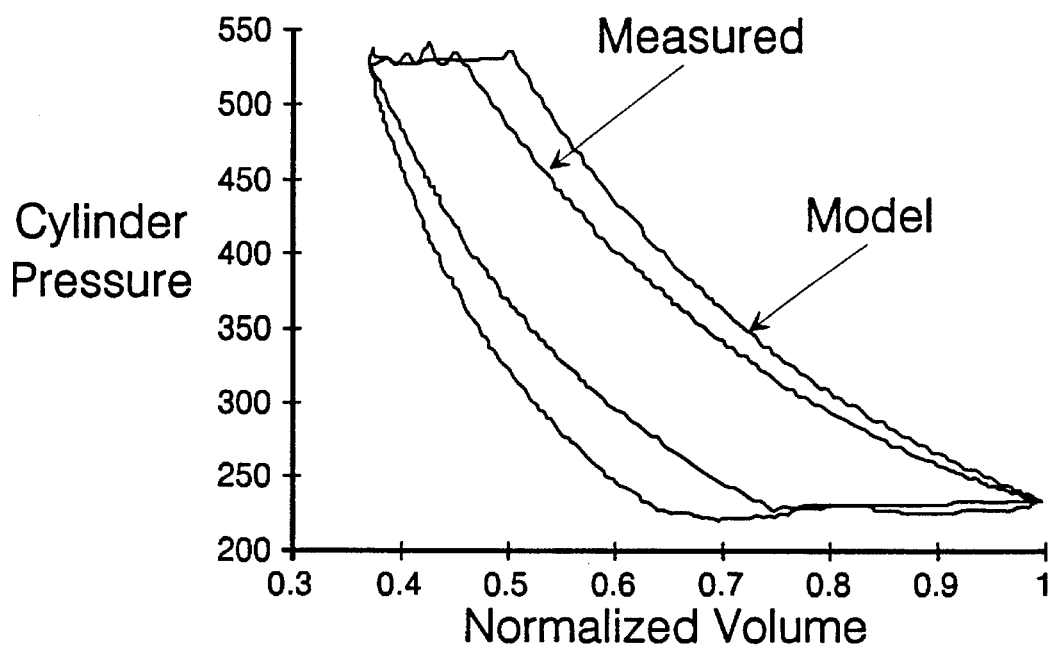
FIG. 6 shows a measured PV card from a compressor cylinder with a leak compared to a simulated ideal PV card for the compressor prior to application of the iterative matching technique of the present invention.

The just described process is initially employed for the compressor cylinder 12 in question to produce a predicted PV card with no simulated leaks or, perhaps, a predetermined starting value for the simulated leaks. The resulting predicted PV card is then compared to the PV card actually measured from the operating compressor cylinder 12. This comparison is best illustrated in FIG. 6 wherein the calculated PV card with no simulated leaks is shown overlying the measured PV card from the compressor cylinder 12.

Figure 8:
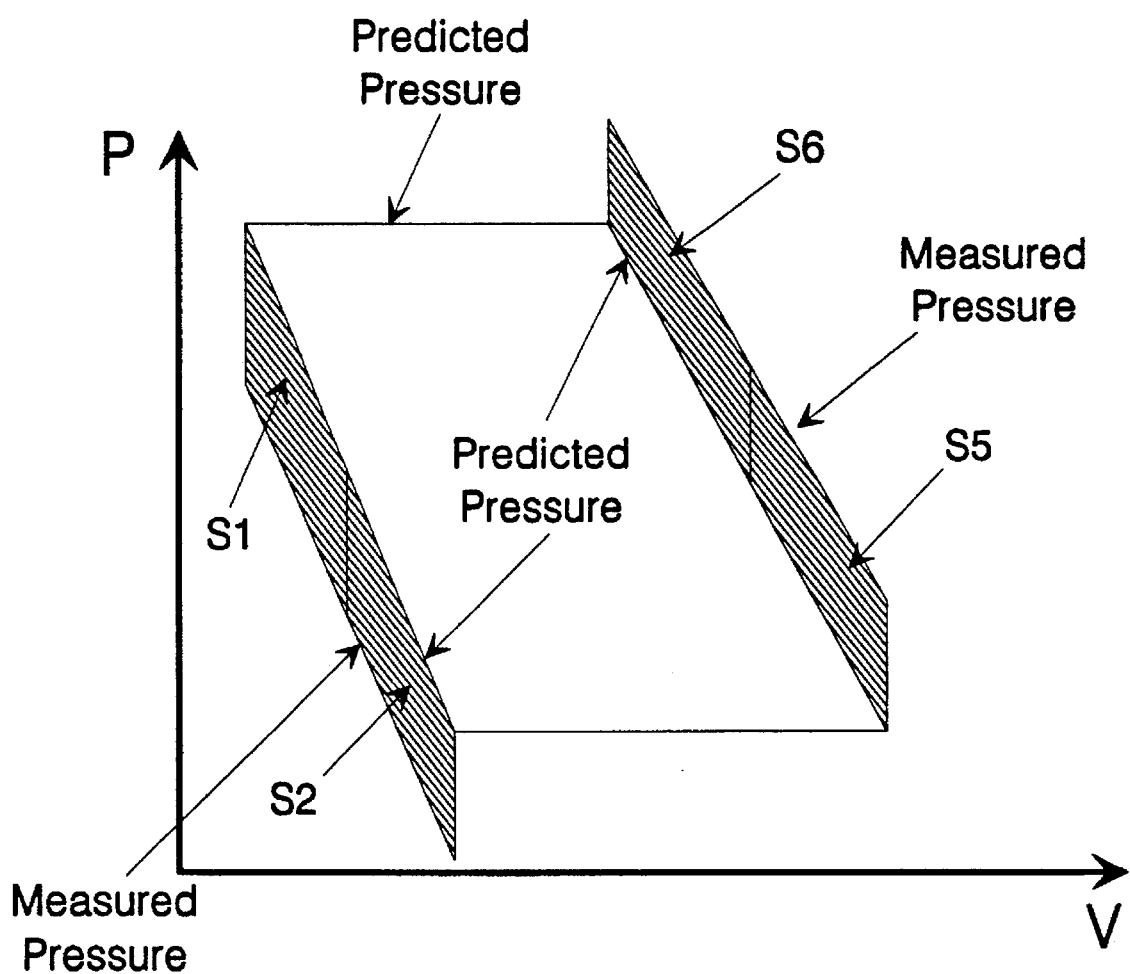
FIG. 8 is a PV card graph illustrating how differences in measured and simulated values are divided into subregions to determine which leak parameters are to be iteratively changed ill the method of the present invention.
Figure 9A:
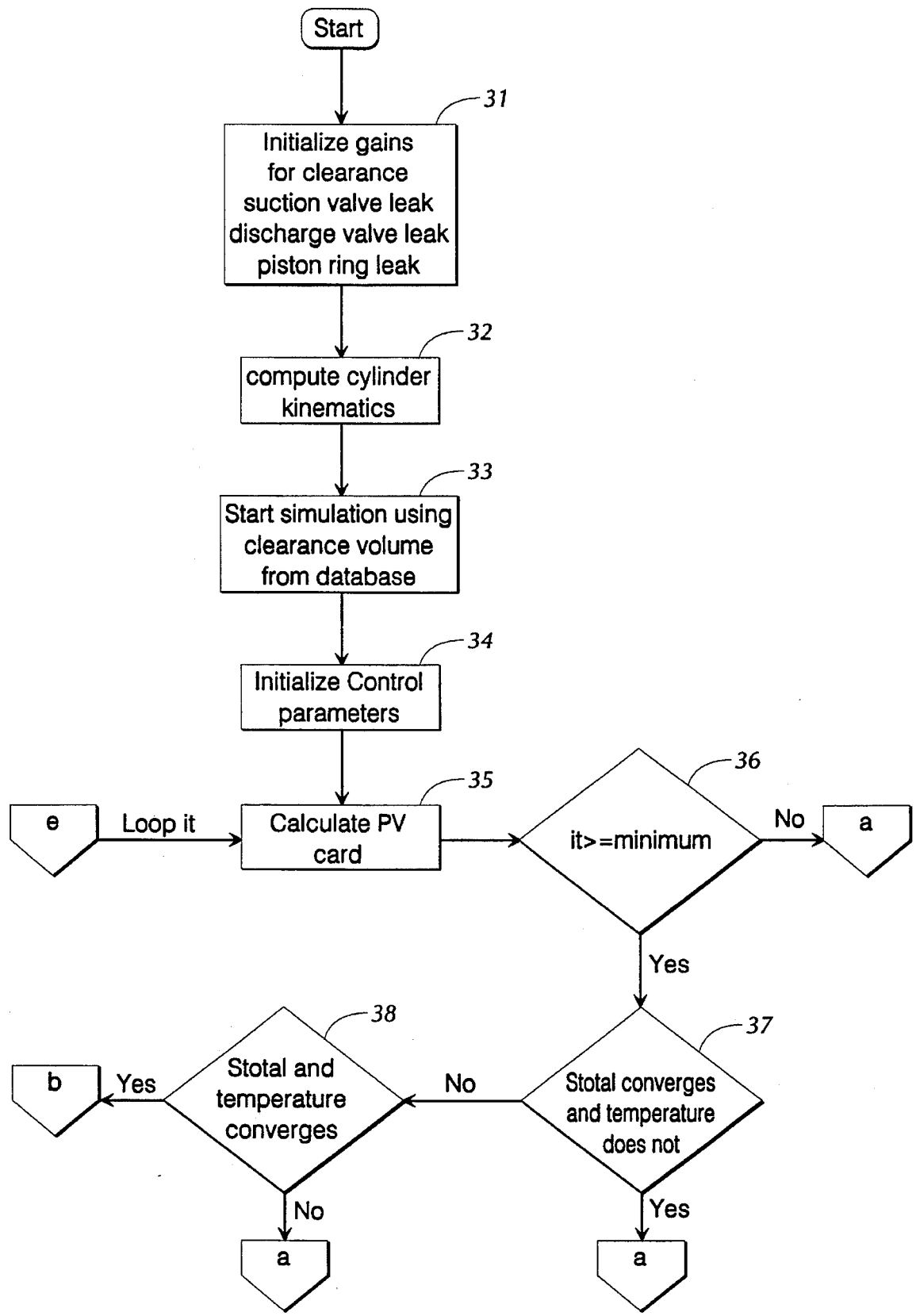
FIGS. 9A through 9I comprise a flow chart illustrating a preferred methodology for implementing the present invention on a computer.
Figure 9B:
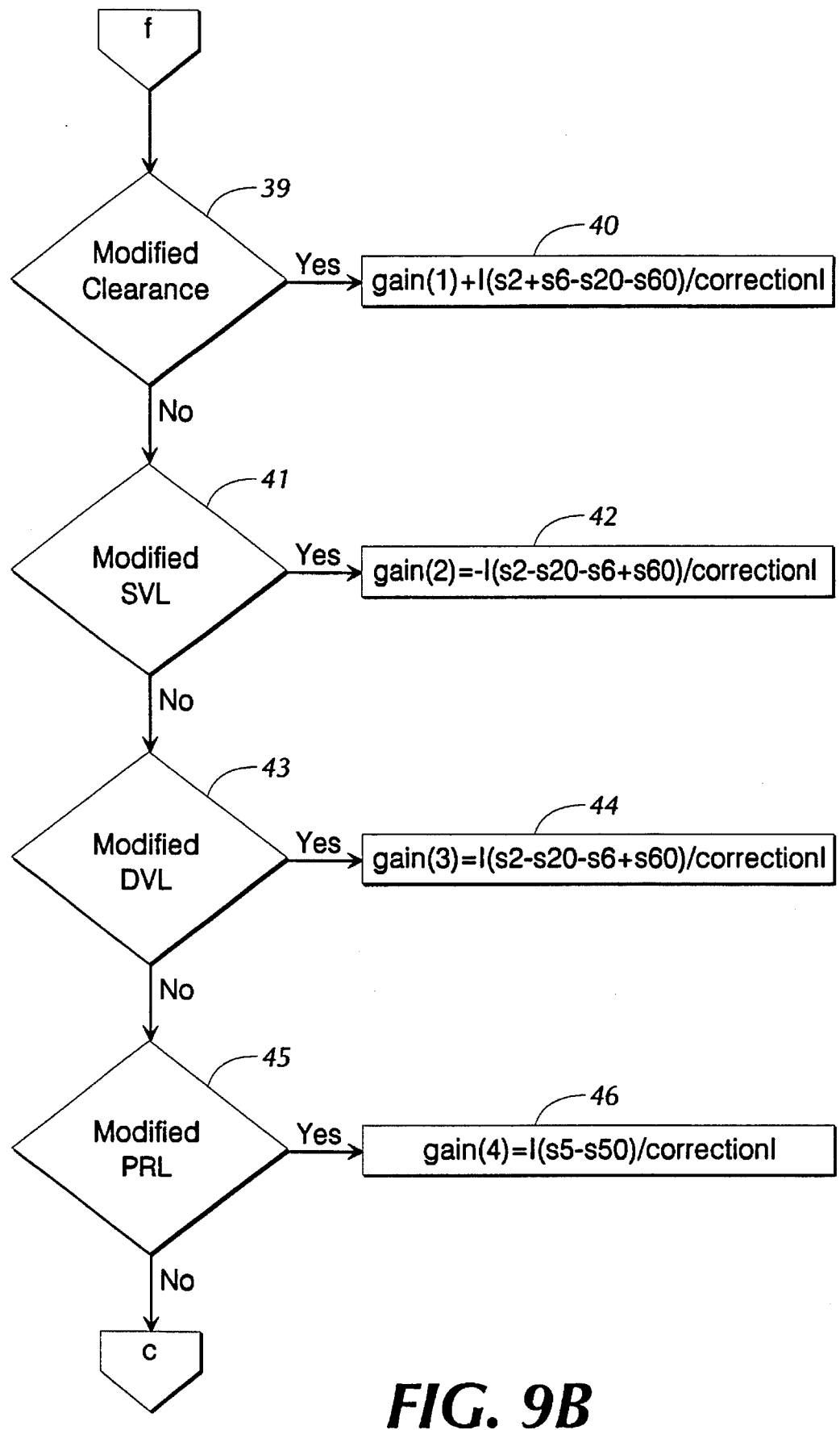
Figure 9C:
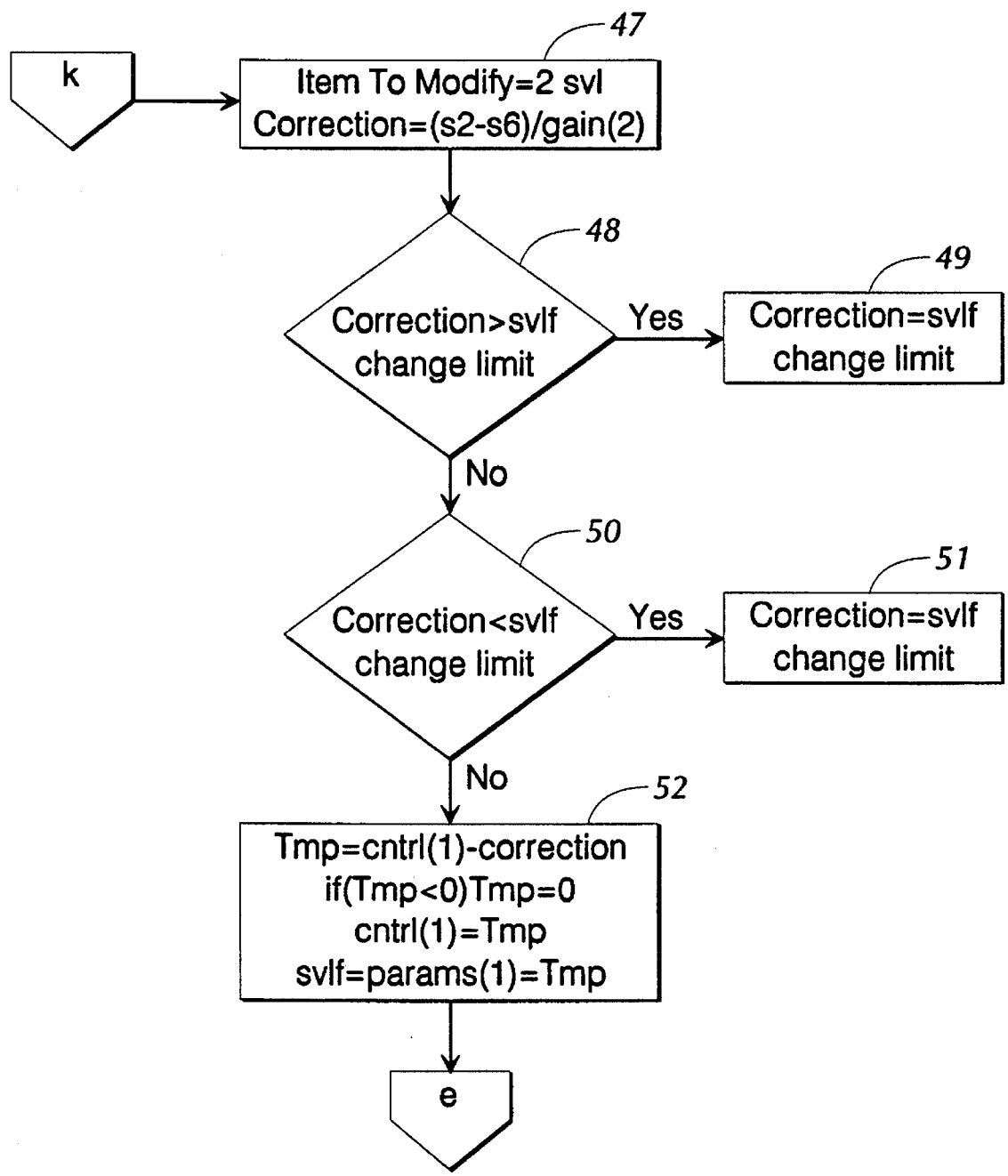
Figure 9D:
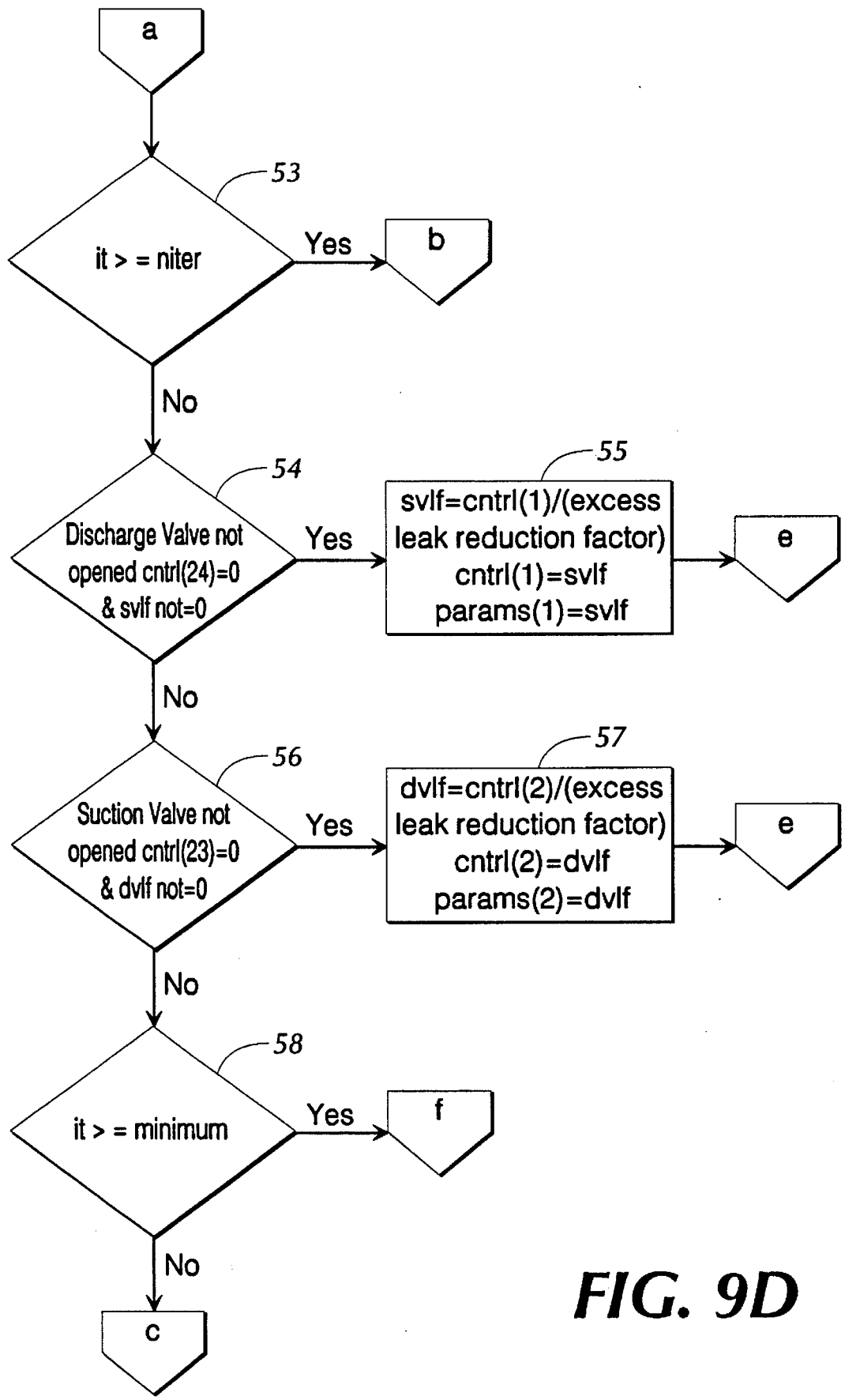
Figure 9E:
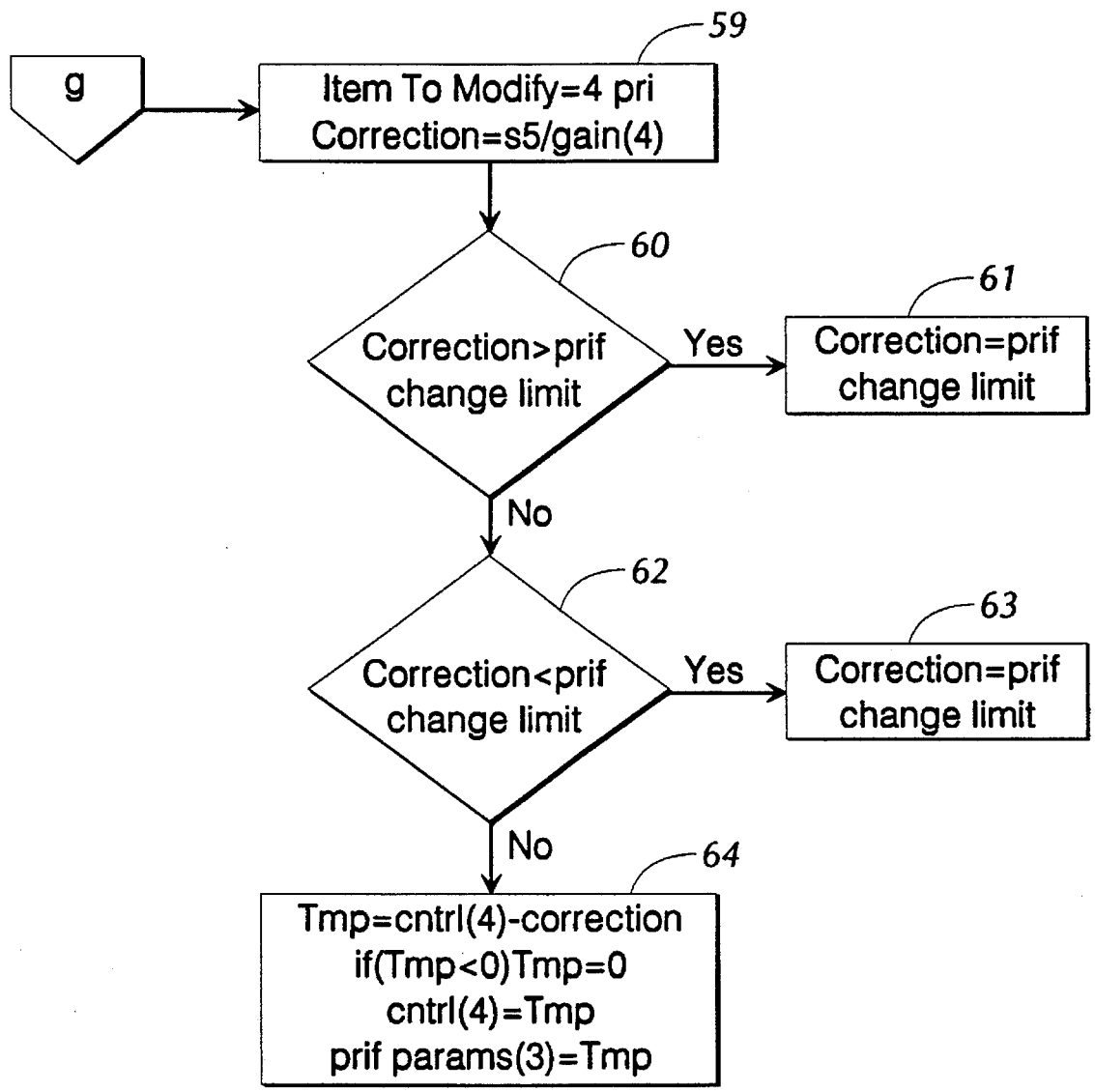
Figure 9F:
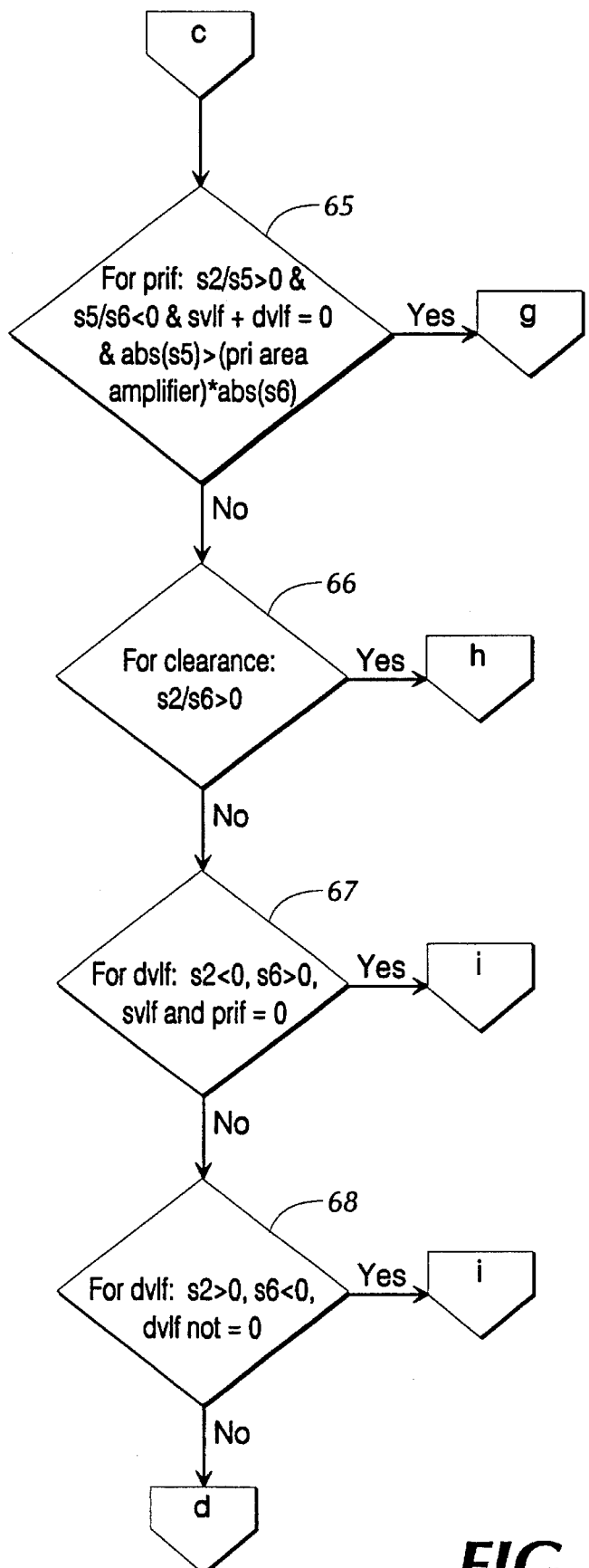
Figure 9G:
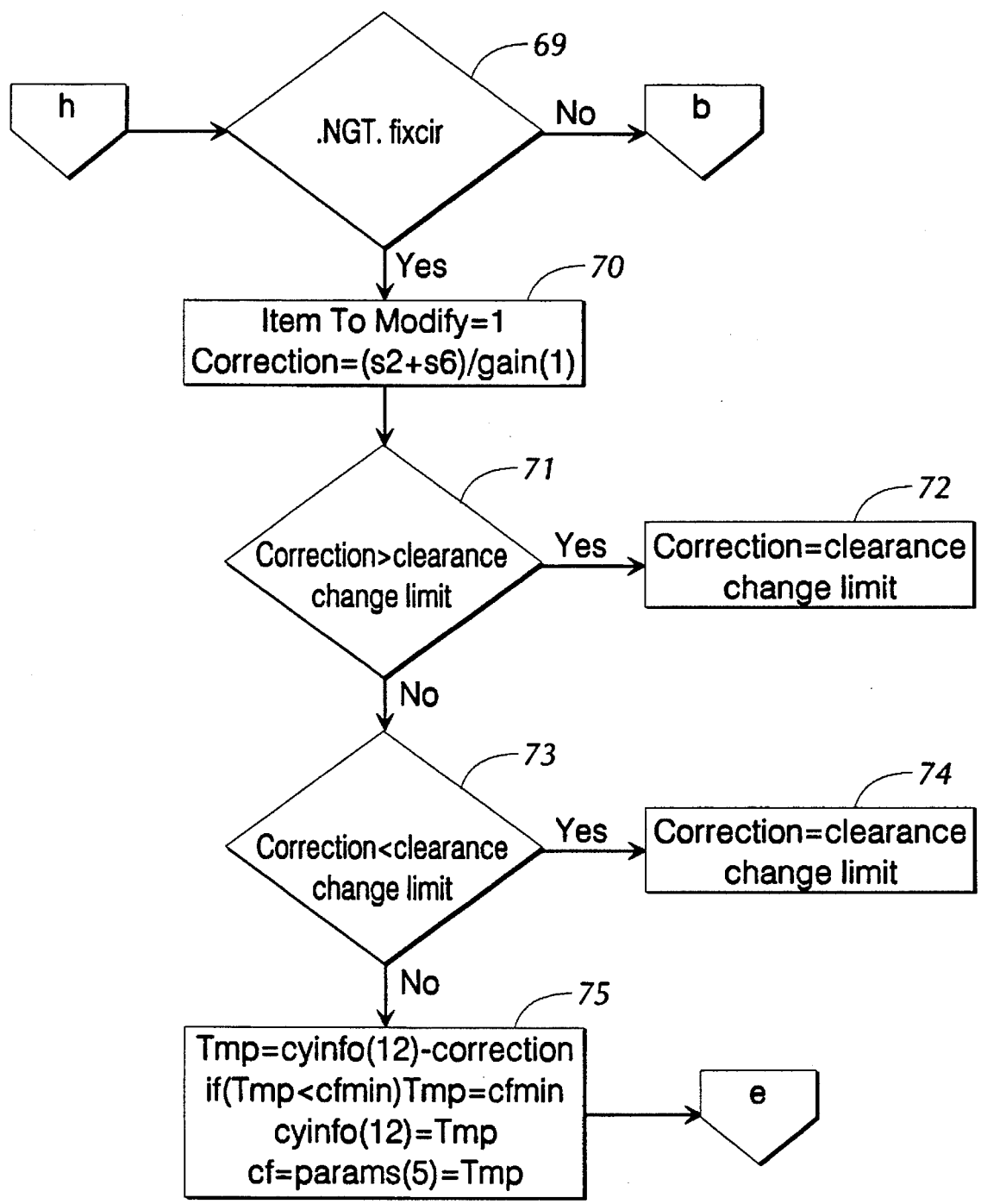
Figure 9H:
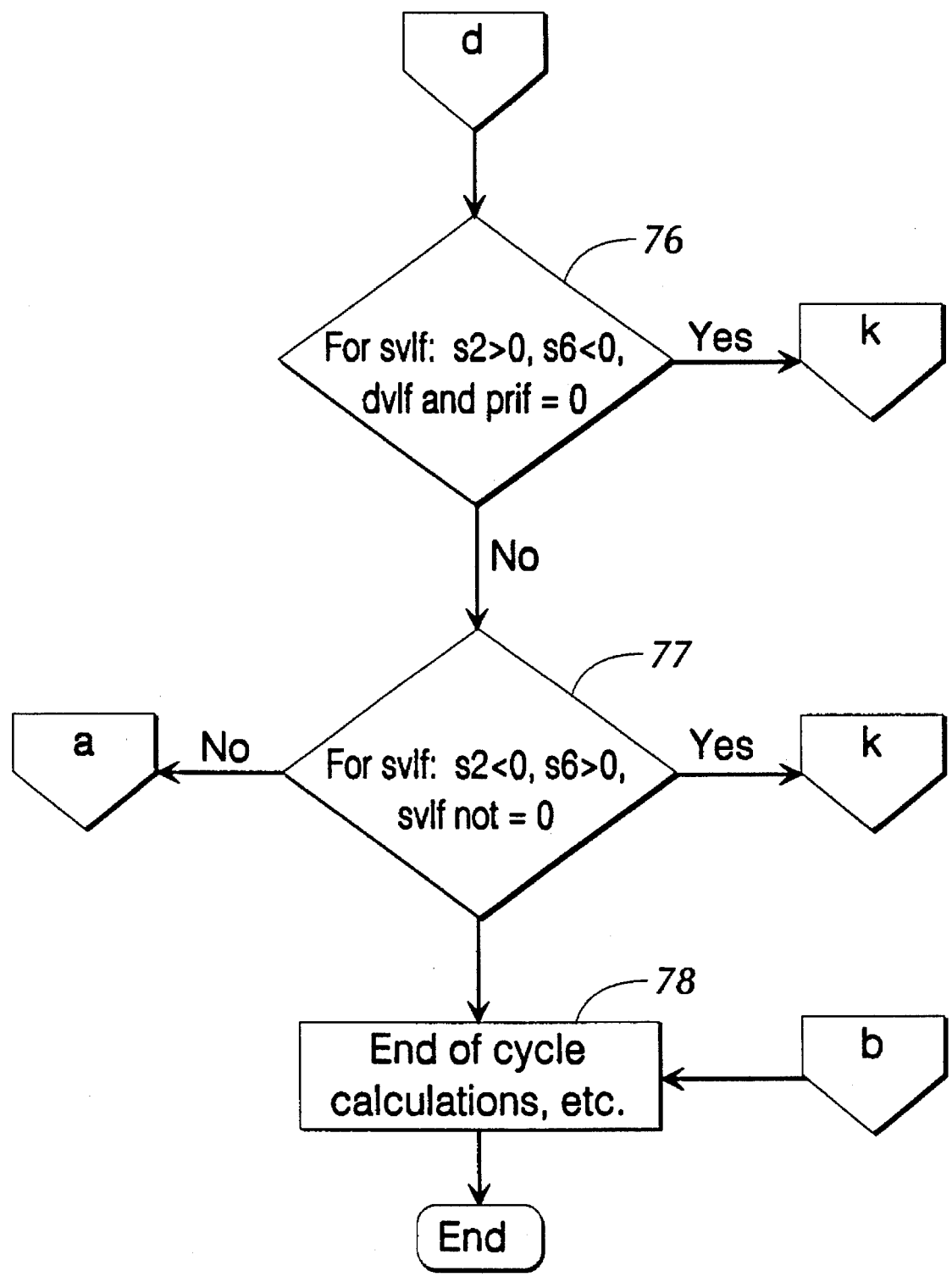
Figure 9I:
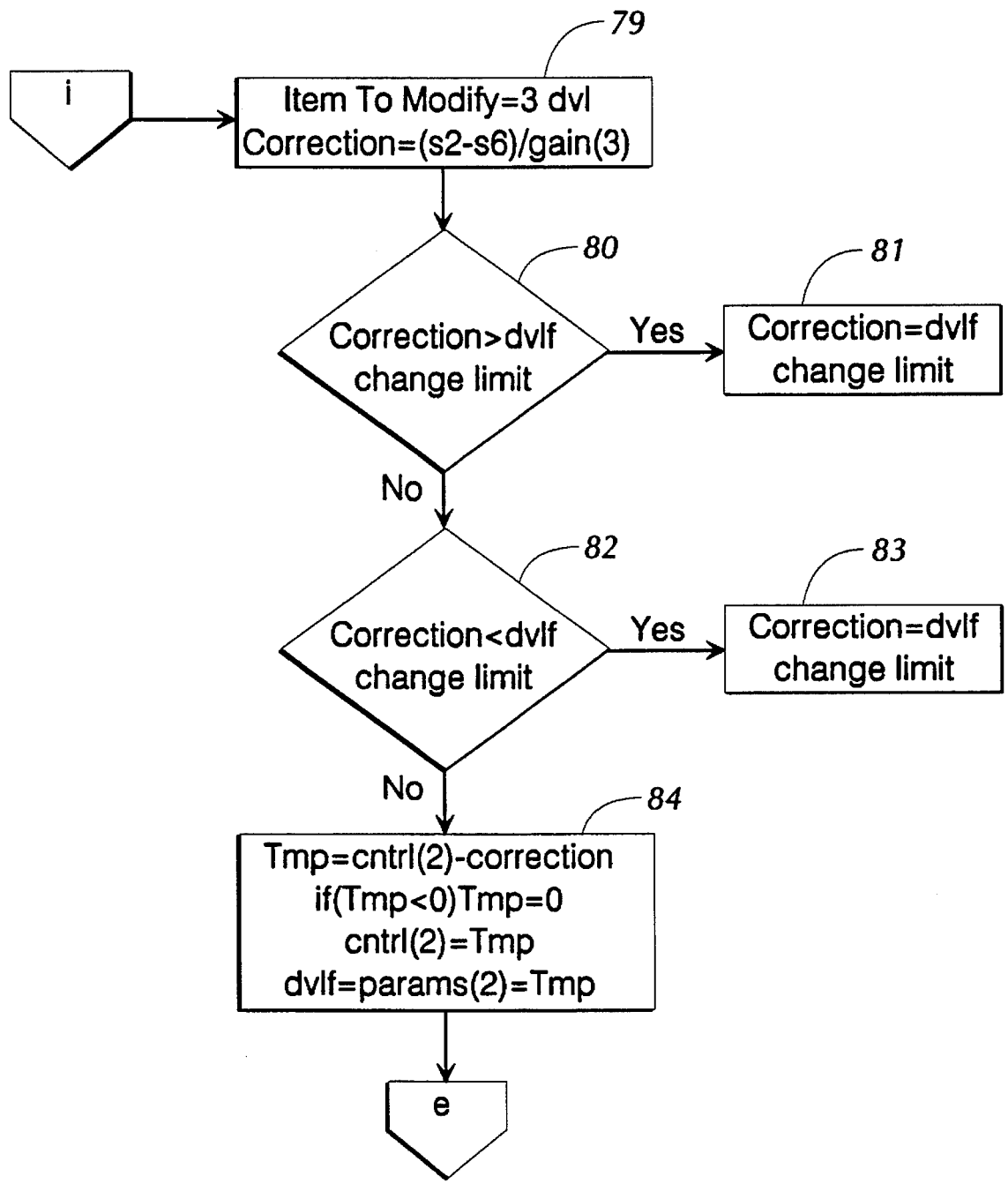

The method then analyzes the characteristics of differences between the measured and predicted cards in conjunction with knowledge about such differences to make an initial guess or hypothesis about the type of leak that would cause such a difference. Specifically, and with reference to FIG. 8, four areas or subregions of discrepancy between the predicted and measured PV cards are determined. These subregions are labeled S1, S2, S5, and S6 and are indicated by shading in FIG. 8. Generally, subregions S1 and S2 represent the difference between the measured and predicted cards on the re-expansion stroke of the piston 15 (during the period before the suction valve opens when pressure is falling within the cylinder 12). The lines bounding these regions are known as the re-expansion or suction lines of the graph. Similarly, subregions S5 and S6 represent the difference between the cards on the compression stroke of the piston 15 (during the period before the discharge valve opens when pressure is rising in the cylinder 12). The lines bounding these regions are known as the compression line of the graph. The substantially constant pressure portions of the curves (the suction and discharge strokes), during which gas is being drawn into or expelled from the cylinder 12, are not utilized in determining which type of leak should be hypothesized.

In bounding subregions S1, S2, S5, and S6, vertical or constant volume lines are drawn at the volume points along the measured suction and discharge lines where minimum and maximum pressure occurs and at the volume points where measured pressure is midway between minimum and maximum pressure. The four subregions are then bounded in pressure/volume space by these constant volume lines and by the measured and predicted suction lines and discharge lines. Based on the values of the subregions S1, S2, S5, and S6, the method of the present invention determines which of the various possible simulated leaks should be adjusted in the next iteration of the simulation to bring the two cards more closely in line. In making the determination, the thermodynamic cycle model 18 employs the convention that the areas of subregions S1, S2, will be deemed positive or greater than zero if the predicted pressure is greater than the measured pressure within these subregions; Conversely, the areas of subregions S1 S2 will be deemed negative or less than zero if the predicted pressure is less than the measured pressure within these subregions. Further, the areas of subregions S5, S6 will be deemed positive or greater than zero if the measured pressure is greater than the predicted pressure in these subregions; conversely, the area of subregions S5, S6 will be deemed negative or less than zero if the measured pressure is less than the predicted pressure within these regions. Clearly, however, other sign conventions might be adopted with comparable results. Using these areas and the preferred convention, leak factor adjustments for the next iteration are determined as follows.

A. Piston Ring Leak Factor To Be Adjusted

The piston ring leak factor is the piston ring leak flow area divided by the suction valve flow area when the suction valve is fully open. The following conditions indicate to the thermodynamic cycle model 18 that the piston ring leak factor included in the simulation should be adjusted to bring the measured and predicted PV cards in line. All three conditions must be satisfied.

1. S2 and S5 are of the same sign; and
2. S5 and S6 are of opposite sign; and
3. The absolute value of S5 is greater than the piston ring leak area amplifier times the absolute value of S6. Piston ring leak area amplifier is a factor greater than one which emphasize the significance of subregion S6 over S5 in piston ring leak determination.

B. Discharge Value Leak Factor To Be Increased

The discharge valve leak factor is the discharge valve leak area divided by the discharge flow area when the discharge valve is fully open. When the following four conditions are all met, the predictive thermodynamic cycle model 18 determines that the simulated discharge valve leak factor should be increased for the next iteration.

1. S2 is less than zero; and
2. S6 is greater than zero; and
3. Suction valve leak factor equals zero, and
4. Piston ring leak factor equals zero.

C. Discharge Valve Leak Factor To Be Decreased

The discharge valve leak factor is decreased in the thermodynamic cycle model 18 when the following conditions are met.

1. S2 is greater than zero; and
2. S6 is less than zero; and
3. Discharge valve leak factor is not equal to zero.

D. Suction Valve Leak Factor To Be Decreased

Suction valve leak factor is defined as the suction valve leak flow area divided by the suction valve flow area when the suction valve is fully open. The suction valve leak factor is decreased for the next iteration when the following conditions are met.
1. S2 is less than zero; and
2. S6 is greater khan zero; and
3. Suction valve leak factor is not equal to zero.

E. Suction Valve Leak Factor To Be Increased

The suction valve leak factor is increased for the next iteration when the following conditions are met.
1. S2 is greater than zero; and
2. S6 is less than zero; and
3. Discharge valve leak factor equals zero; and
4. Piston ring leak factor equals zero.

F. Clearance To Be Changed

Clearance is defined as the minimum volume in the cylinder 12 under analysis divided by the total volume displaced by the piston 15. The clearance is changed in the thermodynamic cycle model 18 for the next iteration when either of the following conditions are met.
1. S2 and S6 are both positive; or
2. S2 and S6 are both negative.

The above conditions for determining which leak factors are to be changed for the next iteration of the simulation are embedded in a complete algorithm, shown in detail in flow chart blocks 31–84 of FIGS. 9A–9I. The amount of change in leak factor or clearance is obtained by dividing the area discrepancy by the gain or adjustment factor; the gain is an estimate of the sensitivity of change in area discrepancy to the change in leak factor or clearance or be changed. Initially, gains or adjustment factors for changes in clearance, suction valve leak factor, discharge valve leak factor, and piston ring leak factor are initialized to values established as effective starting values. The cylinder kinematics, which determine piston volume 20', 20" as a function of crank angle rotation for the current clearance value, are then computed after initializing control parameters.

A simulation of pressure and temperature within the compressor cylinder 12, and motion of and flow through the valves is performed for one complete revolution of the crankshaft and the iteration count is incremented. If the number of completed iterations is less than or equal to the specified minimum allowable number of iterations, the program jumps directly to the clearance and leak adjustment logic wherein adjustments in leak parameters are made according to the foregoing criteria. If the number of iterations exceeds the minimum and either the total deviation area or the temperature repeatability fails to converge, the method also jumps to the clearance and leak adjustment logic. If the number of iterations is greater than or equal to the minimum and the temperatures and total area discrepancy between the predicted results and the measured results converge, then the logic jumps to the point where it performs end of cycle calculations and terminates.

Otherwise, the total number of iterations is tested against the maximum. If greater than the maximum number of iterations have been simulated, the logic jumps to the end of cycle calculations and terminates. If less than the maximum number have been simulated, logic is executed to test whether the suction or discharge leak values are too large to allow the other valve to open. In this case, the leak size is reduced by a factor of two and a new one cycle simulation of cylinder pressure volume is performed, followed by the convergence tests already described.

If discharge and suction valves open satisfactorily, a test is performed on the number of iterations executed. If greater than one, the logic jumps to the point F, where gains or adjustment factors are updated based on the most recent changes in area discrepancies caused by the last one cycle simulation of pressure and temperature in the cylinder 12. Once these gains are updated or if the number of iterations is only one, the logic jumps to the point where it is determined whether and how clearance, piston ring leak factor, suction valve leak factor, or discharge valve leak factor are to be adjusted in the upcoming iteration. If a change is to be made to the suction valve leak factor, the change in suction valve leak factor is then set to the difference between areas S2 and S6 divided by the suction valve leak factor gain. The correction to suction valve leak factor is then limited to a maximum value. Suction valve leak factor is then adjusted by this correction. If the suction valve leak factor should fall below zero, it is see to zero.

If piston ring leak factor is to be changed, the change or correction is set equal to the area S5 divided by the current piston ring leak factor. Again, the allowable correction, positive or negative, is set to the maximum allowable piston ring leak factor for adjustment. The piston ring leak factor is then adjusted by this correction, subject to a limit that the piston ring leak factor shall not be less than zero.

If clearance is to be changed and the control has not been set to hold the clearance fixed, then the clearance correction is set equal to the sum of areas S2 and S6 divided by the clearance gain. The positive or negative correction in clearance is then set to a maximum value. Clearance is adjusted by this constrained correction, and the resulting clearance is further subjected to a minimum value. If the control is set to hold clearance fixed, clearance is not changed.

If the discharge valve leak factor is to be changed, the correction is set equal to the difference in areas S2 and S6 divided by the discharge leak valve leak factor gain. The correction in discharge valve leak factor, positive or negative, is then constrained to a maximum value. The discharge valve leak factor is then adjusted by this correction value, subject to a lower limiting value of zero for the discharge valve leak factor.

Following adjustments in the appropriate leak factors as just described, the logic is repeated from the point where a new one-cycle simulation for pressure and temperature is performed, resulting in a new predicted PV card for the simulated system with simulated leak parameters adjusted as described. This new PV card is then compared again to the measured PV card for the operating compressor cylinder 12 and another adjustment in leak factors and subsequent resimulation is performed.

Figure 7:
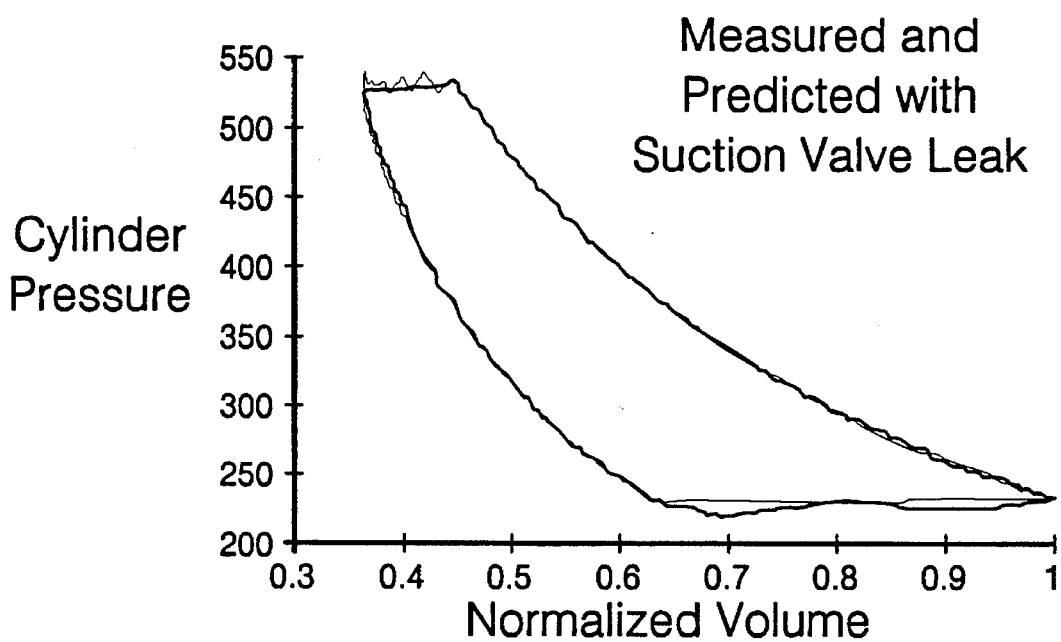
FIG. 7 shows how the measured and simulated PV cards are matched after application of the iterative technique of the present invention.

This methodology is repeated iteratively until the difference between the measured PV card from the operating cylinder 12 and the simulated PV card from the predictive thermodynamic cycle model 18 is less than a predetermined acceptable limit. Alignment of these two cards is illustrated in FIG. 7. At this point, the final values of the leak factor and clearance required to produce the matching curves are analyzed to diagnose and report the types and magnitudes of actual leaks within the operating compressor cylinder 12 that likely produced the measured PV card.

In addition, the thermodynamic cycle model 18 goes on to predict from the diagnosed leaks an efficiency for the compressor cylinder 12 both with the probable leaks and the efficiency that it likely would exhibit with the leaks repaired. This information, in turn, can be converted into actual cost of operation, which is an important factor in determining when to take the compressor 11 off-line for repairs.

The present invention has been described in terms of a preferred embodiment. It will be obvious to those of skill in the art, however, that various additions and modifications may be made to the illustrated system and methodology. For example, the system and method has been described as implemented on a computer coupled, either through disks or directly, to a cylinder indicator that provides raw data regarding compressor cylinder operation. As an alternative, the system and method might just as well be implemented in the cylinder indicator itself or might be implemented in a separate dedicated stand-alone controller. These and other modifications might well be made to the preferred embodiment without substantially departing from the spirit and scope of the present invention, as set forth in the claims.

Wherefore, the following is claimed:

1. A computer based method of detecting and specifying leaks in a reciprocating compressor cylinder having a suction valve, a discharge valve, a reciprocating piston, and piston rings, said method comprising the steps of:

(a) operating the compressor cylinder to generate time varying pressure as a function of cylinder volume within the cylinder;

(b) sensing the pressure within the operating cylinder at predetermined intervals of cylinder volume and generating signals indicative of the sensed pressures;

(c) converting the generated signals to digital data representing the characteristic measured pressure versus volume function for the operating compressor;

(d) conveying the digital data to a computer-based control means;

(e) in the computer-based control means, simulating operation of the compressor cylinder with a predictive analytical model that includes simulations of the effects of leaks in the compressor elements to produce a predicted pressure versus volume function for the compressor, the measured and predicted pressure versus volume functions each exhibiting a compression line and a re-expansion line with a region of difference being defined between the re-expansion lines of the measured and predicted functions and between the compressor lines of the measured and predicted functions;

(f) subdividing in pressure/volume space the region of difference between the re-expansion lines of the measured and predicted functions into subregions S1 and S2, subregion S1 being bounded by the measured and predicted re-expansion lines, by a constant volume line at the volume where maximum pressure on the measured re-expansion line occurs, and by a constant volume line at the volume where measured pressure is midway between the minimun and maximum pressure on the measured re-expansion line, subregion S2 being bounded by the measured and predicted re-expansion lines, by a constant volume line at the volume where measured pressure is midway between the minimum and maximum pressure on the measured re-expansion line, and by a constant volume line at the volume where minimum pressure occurs on the measured re-expansion line, and subdividing the region of difference between the compression lines of the measured and predicted functions into subregions S5 and S6, subregion S5 being bounded by the measured and predicted compression lines, by a constant volume line at the volume where minimum pressure occurs on the measured compression line, and by a constant volume line at the volume where measured pressure is midway between the minimum and maximum pressure on the measured compression line, subregion S6 being bounded by the measured and predicted compression lines, by a constant volume line at the volume where measured pressure is midway between the minimum and maximum pressure on the measured pressure line, and by a constant volume line at the volume where maximum pressure occurs on the measured compression line, the areas of each of the subregions S1, S2, S5, and S6 being positive if measured pressure is greater than predicted pressure in the subregion and negative if measured pressure is less than predicted pressure in the subregion.

(g) analyzing the areas of subregions S1, S2, S5, and S6;

(h) determining based on the results of step (g) the nature of changes in simulated leaks within the predictive analytical model that likely would cause a desired change in the areas of and relationships between the subregions S1, S2, S5, and S6;

(i) changing the simulated leaks within the predictive analytical model according to the determination of step (h);

(j) repeating steps (e) through (i) until, in step (d), the areas of and relationships between subregions S1, S2, S5, and S6 meet a predetermined criteria;

(k) analyzing the final valves of the simulated leaks to predict and specify the nature of probable actual leaks present in the compressor cylinder; and (l) determining a course of remedial repairs to be performed on the compressor cylinder based upon the predictions and specifications of step (k).

2. A method of detecting and specifying leaks in a reciprocating compressor cylinder as claimed in claim 1 and wherein the reciprocating piston is driven by a rotating crank shaft and wherein step (b) comprises measuring the pressure within the cylinder at predetermined intervals of crankshaft rotation and converting the pressure versus crankshaft angle to pressure versus cylinder volume using known physical characteristics of the compressor cylinder.

3. A method of detecting and specifying leaks in a reciprocating compressor cylinder as claimed in claim 1 and wherein step (e) comprises solving the first law of thermodynamics, step-by-step, for small intervals of cylinder volume resulting in a gas temperature within the cylinder for each interval and deriving gas pressure for each interval from the calculated temperature.

4. A method of detecting and specifying leaks in a reciprocating compressor cylinder as claimed in claim 3 and wherein the steps of solving the first law of thermodynamics comprises solving the equations $$\Delta U = \Delta Q - \Delta W + \Delta t \sum_i \dot{m}_i h_i$$

$$T = U/C_v$$

for each successive interval of crankshaft rotation.

5. A method of detecting and specifying leaks in a reciprocating compressor cylinder as claimed in claim 4 and wherein the step of deriving gas pressure for each interval comprises solving the equations $$\Delta m = \Delta t \sum_i \dot{m}_i$$

$$P = mZRT/V_{cyl}$$

for each successive interval of crankshaft rotation.

6. A method of detecting and specifying leaks in a reciprocating compressor cylinder as claimed in claim 1 and where in step (e) the simulations of the effects of leaks includes the calculation of a piston ring leak factor defined as the piston ring leak flow area divided by the suction valve flow area when the suction valve is fully open, a discharge valve leak factor defined as the discharge valve leak area divided by the discharge valve flow area when the discharge valve is fully open, and a suction valve leak factor defined as the suction valve leak flow area divided by the suction valve flow area when the suction valve is fully open.

7. A method of detecting and specifying leaks in a reciprocating compressor cylinder as claimed in claim 6 and wherein step (h) comprises determining that the simulated piston ring leak factor is to be changed for the next iteration if the following conditions are met:

(1) the areas of S2 and S5 are of the same sign; and (2) the areas of S5 and S6 are of opposite sign; and (3) the magnitude of the area of S5 is greater than the current piston ring leak factor times the magnitude of the area of S6.

8. A method of detecting and specifying leaks in a reciprocating compressor cylinder as claimed in claim 6 and wherein step (h) comprises determining that the simulated discharge valve leak factor is to be increased for the next iteration if the following conditions are met:

(1) the area of S2 is negative; and (2) the area of S6 is positive; and (3) the suction valve leak factor is equal to zero; and (4) the piston ring leak factor equals zero.

9. A method of detecting and specifying leaks in a reciprocating compressor cylinder as claimed in claim 6 and wherein step (h) comprises determining that the simulated discharge valve leak factor is to be decreased for the next iteration if the following conditions are met:

(1) the area of S2 is positive; and (2) the area of S6 is negative; and (3) the discharge valve leak factor is not equal to zero.

10. A method of detecting and specifying leaks in a reciprocating compressor cylinder as claimed in claim 1 and wherein step (h) comprises determining that the suction valve leak factor is to be increased for the next iteration if the following conditions are met:

(1) the area of S2 is positive; and (2) the area of S6 is negative; and (3) the discharge leak factor equals zero; and (4) the piston ring leak factor equals zero.

11. A method of detecting and specifying leaks in a reciprocating compressor cylinder as claimed in claim 1 and wherein step (h) comprises determining that the suction valve leak factor is to be decreased for the next iteration if the following conditions are met:

(1) the area of S2 is negative; and (2) the area of S6 is positive; and (3) the suction valve leak factor is not equal to zero.

12. A computer based method of detecting and specifying the nature of leaks in a reciprocating compressor cylinder comprising the steps of;

(a) operating the compressor cylinder;

(b) measuring the time varying pressure within the operating compressor cylinder;

(c) converting the measurements of step (b) into a first set of digital data representing the time varying pressure within the operating compressor cylinder;

(d) conveying the digital data to a computer;

(e) simulating in the computer the operation of the cylinder with an analytical model that includes simulations of the effects of leaks in the cylinder on the time varying pressure within the cylinder to produce a second set of digital data representing the time varying pressure of the simulated cylinder, said first set of digital data and said second set of digital data defining a region of difference between each other;

(f) subdividing the region of difference between the first and second sets of digital data into predetermined subregions of difference;

(g) analyzing the subregions of difference from step (f) to determine a change in the leak simulation that likely would have a predetermined effect on the subregions if the leak simulation was executed with the change;

(h) changing the leak simulation of step (e) according to the results of step (g);

(i) repeating steps (e) through (h) until, in step (f), the subregions of difference meet a preselected criteria;

(j) analyzing the final condition of the leak simulation to predict the extent and nature of actual leaks in the operating cylinder as represented in the first set of digital data; and (k) determining a course of remedial repair to the cylinder based upon the results of step (j).

13. The method of claim 12 and where in step (c), the first set of digital data comprises an actual pressure versus volume function exhibiting a compression line corresponding to the rise in pressure with decreasing volume in the cylinder and a re-expansion line corresponding to a fall in pressure with increasing volume in the cylinder, and wherein the second set of digital data in step (e) comprises a simulated pressure versus volume function exhibiting a compression line and a re-expansion line, and wherein the region of difference is defined between the compression lines of the actual and simulated pressure versus volume functions and between the re-expansion lines of the actual and simulated pressure versus volume functions.

14. The method of claim 13 and wherein step (f) comprises subdividing the region of difference between the compression lines of the actual and simulated pressure versus volume functions to define first and second subregions.

15. The method of claim 14 and wherein step (f) further comprises subdividing the region of difference between the suction lines of the actual and simulated pressure versus volume functions to define third and fourth subregions.

16. The method of claim 15 and wherein step (g) comprises comparing the first, second, third, and fourth subregions with each other.

* * * * *

UNITED STATES PATENT AND TRADEMARK OFFICE
CERTIFICATE OF CORRECTION

PATENT NO. : 5,471,400
DATED : November 28, 1995
INVENTOR(S) : Smalley et al.

It is certified that error appears in the above-indentified patent and that said Letters Patent is hereby corrected as shown below:

In column 6, line 19, delete "." after "system."

In column 8, lines 62-65, remove the indention.

In column 9, line 60, delete "line" and replace with --lines--.

Signed and Sealed this

Twenty-seventh Day of February, 1996

*Attest:*

BRUCE LEHMAN

*Attesting Officer*  *Commissioner of Patents and Trademarks*